United States Patent [19]

McElhaney

[11] 4,281,530
[45] Aug. 4, 1981

[54] APPARATUS FOR CUTTING AND FORMING TUBING

[75] Inventor: William G. McElhaney, Jacksonville, Tex.

[73] Assignee: Anvil Corporation, Jacksonville, Tex.

[21] Appl. No.: 42,897

[22] Filed: May 29, 1979

[51] Int. Cl.³ .......................................... B21D 43/28
[52] U.S. Cl. ...................................... 72/294; 72/305; 72/307; 226/162
[58] Field of Search ................. 72/294, 305, 306, 307, 72/309, 369, 311; 226/162, 158

[56] References Cited

U.S. PATENT DOCUMENTS

| | | | |
|---|---|---|---|
| 1,152,858 | 9/1915 | Stewart | 72/367 |
| 1,817,854 | 8/1931 | Sorensen | 72/363 |
| 1,980,264 | 11/1934 | Giesler | 72/59 |
| 2,803,456 | 8/1957 | Powers | 226/164 |
| 2,965,965 | 12/1960 | Allan | 72/356 |
| 3,008,223 | 11/1961 | Frank | 29/156.8 H |
| 3,130,771 | 4/1964 | Peyton | 72/59 |
| 3,152,631 | 10/1964 | Coffey | 72/294 |
| 3,256,730 | 6/1966 | Faull | 72/294 |
| 3,301,033 | 1/1967 | Bignell et al. | 72/294 |
| 3,648,500 | 3/1972 | Vaill | 72/294 |
| 3,648,509 | 3/1972 | McDowell | 72/318 |
| 3,722,253 | 3/1973 | Tsuda et al. | 72/338 |
| 4,059,212 | 11/1977 | Ledgerwood | 226/162 |
| 4,131,224 | 12/1978 | Gerber et al. | 226/162 |

Primary Examiner—Daniel C. Crane
Attorney, Agent, or Firm—Richards, Harris & Medlock

[57] ABSTRACT

An apparatus for forming tube components from a length of tube includes a transport clamp (34) mounted for controlled movement in a first and a second direction along a predetermined path (30). The tube is clamped within the transport clamp (34) when the transport clamp is moved in the first direction thereby drawing the tube along the predetermined path (30). Adjustable switches (42, 44) cooperate with the transport clamp (34) for controlling the forward and rearward movement of the transport clamp (34). A forming clamp (90) is mounted in the predetermined path for selectively clamping the tube when the transport clamp (34) is moving in the second direction. A cutoff assembly (96) operates to cut the tube into severed tube pieces. A tube forming assembly (92) is selectively positionable within the predetermined path for forming the end of the tube. Intermediate switch structure (56) is adjustable relative to the adjustable switches (42, 44) for controlling the operation of the forming assembly (92).

21 Claims, 10 Drawing Figures

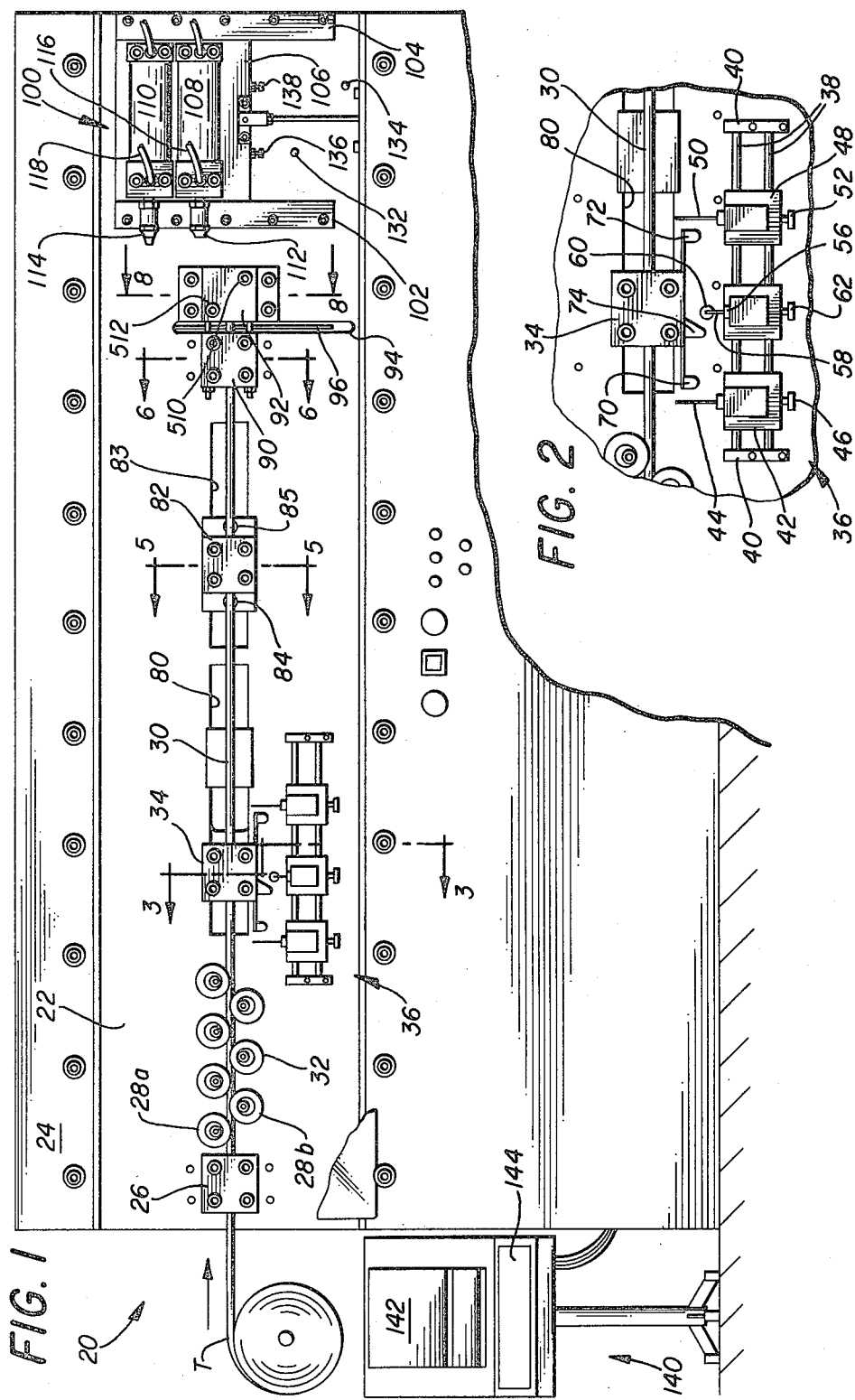

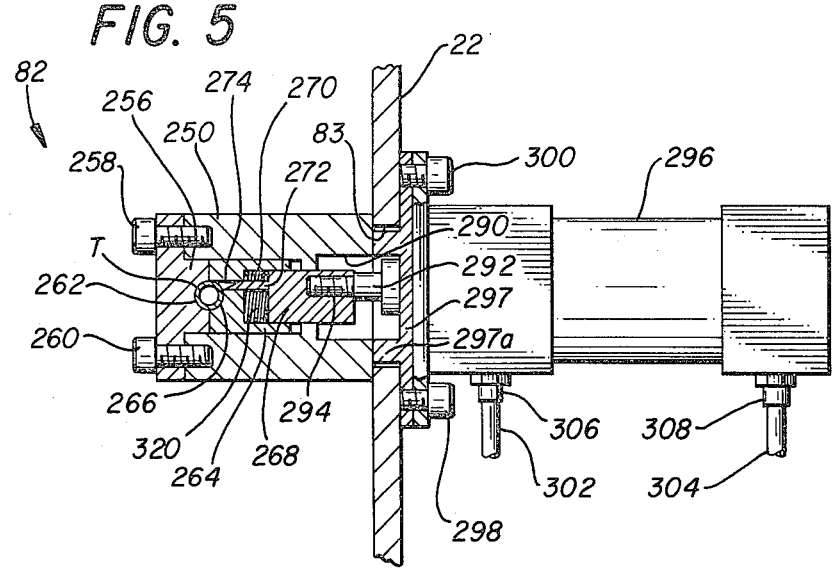
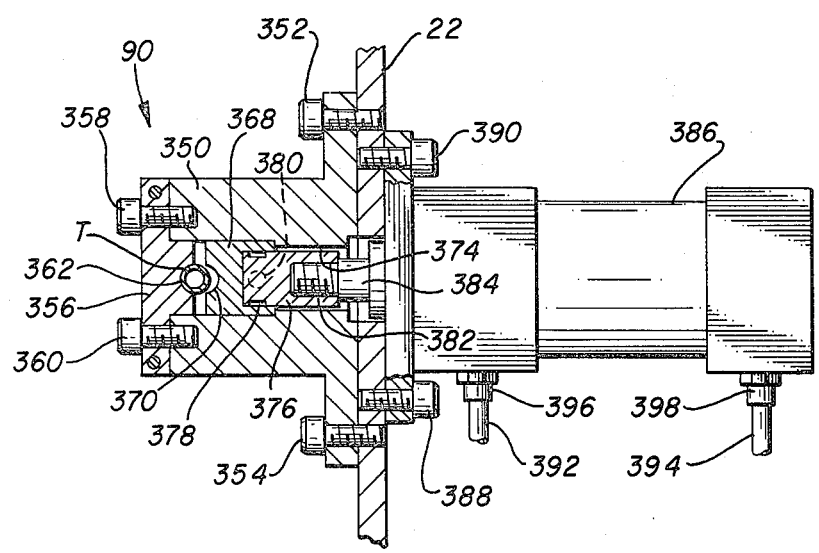

APPARATUS FOR CUTTING AND FORMING TUBING

TECHNICAL FIELD

The present invention relates to a method and apparatus for cutting and forming tubing.

BACKGROUND ART

In the production of many fluid control devices, such as air conditioning systems and heat exchangers, it is necessary to cut and form numerous pieces of tubing. In forming these tube pieces in the past, a tube cutting machine has been used to first sever the tube into a plurality of pieces of a desired length and a different machine used to perform secondary operations on the precut lengths of tube. Further, a separate machine has been used to perform secondary operations on the ends of the tube, such as to flair the end of the tube or form a bead thereon, with a different machine used to punch apertures in the tube side wall.

Thus, the prior art approach for cutting and forming tube pieces for later use in fluid control systems has been to first cut the tube to length and then to perform the secondary operation on the severed tube piece. Considering that numerous such components must be produced of identical design, this two-stage operation involves substantial time and machinery. Part of the time required in the production of such a tube piece is merely in transporting of the severed tube pieces from first machine to the second machine. Additional time is involved in aligning the severed tube piece in the second machine so that the secondary operation can be performed. Where the tube piece, once one secondary operation has been performed thereon, must then be positioned in a third machine, additional time is required and the expense and the cost of the final product is substantially increased.

While some machines have been used to perform multiple operations on tubing, such as that disclosed in the patent to W. W. Frank, U.S. Pat. No. 3,008,223, issued Nov. 14, 1961, these apparatus have not provided a system for mass producing numerous tube pieces cut to an appropriate length and formed with one or more secondary operations performed thereon on a single machine having the capability of changing both the tube length and the operations performed on the tube in a quick and efficient manner.

DISCLOSURE OF THE INVENTION

The present invention provides a method and apparatus for forming tube pieces with one or more secondary operations performed thereon from a continuous piece of tube stock. The present invention orovides a method and apparatus which is both automatic and provides for varying the secondary operations performed on the tubing as well as the length of the tubing with ease and economy.

The present invention includes a tube cutting and forming apparatus including a frame having a transport clamp mounted for controlled horizontal movement on the frame. The transport clamp receives tubing therein and includes an actuator for selectively clamping the tubing. As the transport clamp moves in a first direction, the clamp mount is actuated to clamp the tubing and draw it along a predetermined path.

The movement of the transport clamp is controlled by a forward and rearward limiting switch engaged by the transport clamp as it moves along the predetermined path. The forward limiter defines the forward most movement of the transport clamp and the rearward limiter defines the rearmost movement of the transport clamp. The limiter switches are adjustable along the predetermined path such that the movement of the transport clamp may be adjusted as desired. An intermediate switch is mounted between the first and second limiting switches and defines the sequence of tube forming operations as will be described herinafter in greater detail.

A saw clamp is also mounted on the frame along the predetermined path and includes actuation means for selectively clamping the tubing therein. As the transport clamp moves in the first direction to advance the tubing along the predetermined path, the saw clamp is maintained in an open position to permit the continued feeding of the tube along the predetermined path. A cutoff saw is mounted adjacent the saw clamp and is controlled by an actuator to move across the predetermined path to sever the tube as desired.

A forming mandrel is mounted on the side of the cutoff saw opposite the saw clamp and is also controlled to selectively engage the tube. A plurality of forming heads are mounted on a slide unit providing for the movement of each forming unit into the line of the predetermined path and aligned with the end of the tube. Control structure is provided for sequentially aligning each forming head with the tubing and for advancing the forming unit against the tubing while clamped in the forming mandrel to perform operations on the end of the tube.

In one embodiment of the invention, the cutoff saw is advanced to sever the tube subsequent to forming the end of the tube by the forming units. In another embodiment of the invention, the tubing is severed into predetermined lengths and advanced into the forming mandrel where the ends of the tube are sequentially formed by the forming heads as they move to the end of the mandrel and are exposed to the forming heads.

After the tube components have been formed and severed, the tube piece is released by the forming mandrel and the completed tube piece is projected from the forming mandrel by advancing the tubing along the predetermined path. In one embodiment of the invention, ejection of the formed tube piece is facilitated by a blast of compressed air directed from the forming mandrel against the completed tube piece.

The intermediate switch structure mounted between the forward and rearward limiting switches controls the operation of the forming units. The actuation of the cutoff saw may be controlled in sequence with either the forming unit of the intermediate switch.

In one embodiment of the invention, a punch clamp is mounted intermediate of the transport clamp and the saw clamp and along the predetermined path for receiving the tubing therethrough. The punch clamp includes an actuator for engaging the tubing and for punching the tubing as desired. In one embodiment of the invention, the tube clamp may be freely adjusted along the frame to properly dimension the position at which the punch is used to form openings in the side wall of the tubing.

In accordance with still another embodiment of the invention, the apparatus includes a plurality of straightening rollers aligned along the predetermined path and positioned ahead of the transparent clamp for straightening the tubing prior to advancement of the tubing to the transport clamp.

The operation of each of the components of the apparatus, including the movement of the transport clamp, and actuation of the transport clamp to grasp the tubing as the transport clamp moves in its first direction, the engagement of the punch clamp and the actuation of the punch to form an aperture in the side wall of the pipe, the actuation of the saw clamp and forming mandrel, the movement of the cutting saw to sever the tubing, is controlled by a microprocessor-base programmable controller. The controller is programmed such that the forming operations are performed in the proper sequence with the advancement of the tube. The controller controls the advancement of the tube such that the desired tube length is generated. The forming units are coordinated with the other components by the controller such that the desired forming steps are performed on the ends of the tubing while the tubing is engaged within the forming mandrel.

Any desired length of tube component may be produced by merely inputting required information into the microprocessor controller. Likewise, any end forming step may be performed on the tube provided for by the forming units or any punch operation. Further, these operations may be varied from run to run by instruction to the microprocessor controller.

DESCRIPTION OF THE DRAWINGS

For a more complete understanding of the present invention, and for further details and advantages thereof, reference is now made to the following description taken in conjunction with the accompanying drawings, in which:

FIG. 1 is a front view of the tube forming and cutting apparatus of the present invention;

FIG. 2 illustrates a front enlargement of the transport clamp and control switches illustrated in FIG. 1;

FIG. 5 illustrates a section view taken along line 5—5 of FIG. 1;

FIG. 6 illustrates a section view taken along line 6—6 of FIG. 1;

DESCRIPTION OF THE PREFERRED EMBODIMENT

Figure 3:
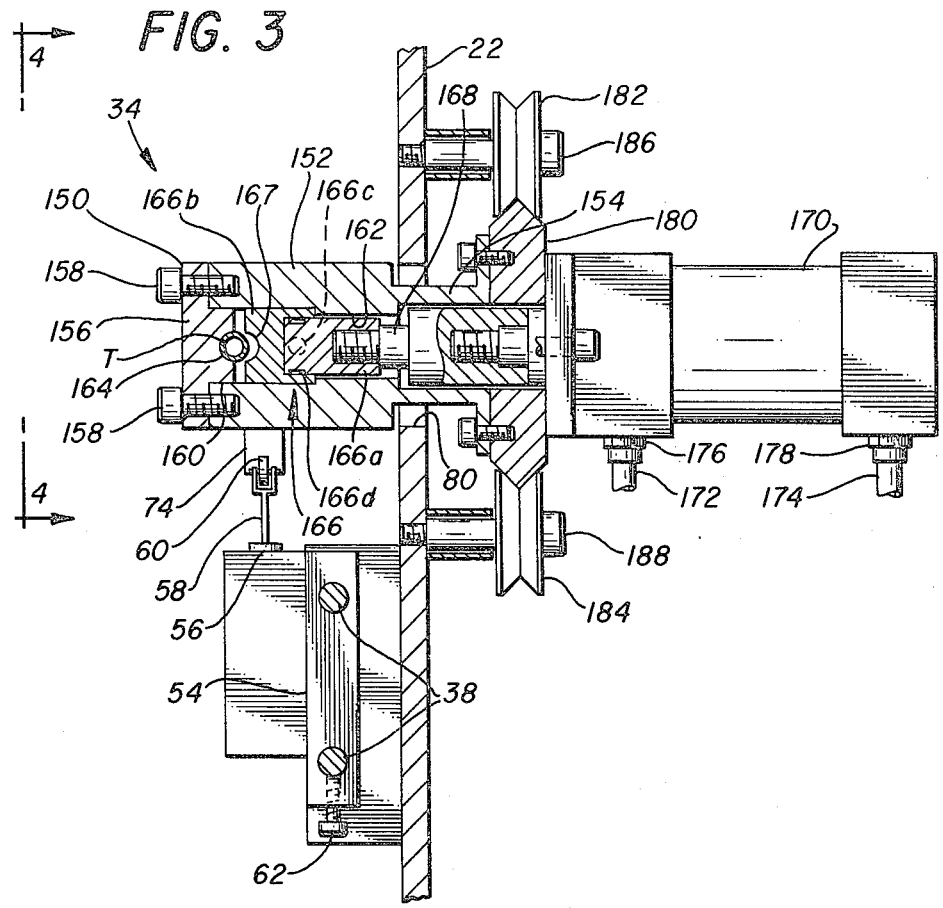
FIG. 3 illustrates a section view taken along line 3—3 of FIG. 1.

Referring to FIG. 1, a front view of the tube forming and cutting apparatus 20 is illustrated. Forming and cutting apparatus 20 includes a vertical frame plate 22 supported at an appropriate height by housing 24. Plate 22 has a feed clamp 26 mounted thereon defining the point of entry of tubing T into apparatus 20. A plurality of straightening rollers 28a and 28b are mounted on opposite sides of a predetermined patch 30 defined by the path of movement of tubing T. Straightening rollers 28a are mounted above path 30 while rollers 28b are mounted below the path. Rollers 28a and 28b are eccentrically mounted on axes 32 permitting adjustment of the rollers relative to path 30 to appropriately straighten the tubing T as it is fed into the apparatus.

Referring to FIGS. 1 and 2, a movable transport clamping 34 extends through plate 22 for receiving tubing T along the predetermined path 30. A limiter assembly 36 is mounted immediately below the transport clamp 34 an includes a pair of slide rails 38 fixedly attached to plate 22 by end mounts 40. A rearward limiting switch 42 is slidably mounted on rails 38 of assembly 36 and has a whisker switch 44 extending upwardly therefrom. Switch 42 is slidably adjustable along rails 38 and includes a set screw 46 for setting the switch at a selected position along rails 38. A forward limiting switch 48 is also mounted on rails 38 of assembly 36 and includes a whisker switch 50 extending upwardly therefrom. Switch 48 is slidable along rails 38 an includes set screw 52 for fixing switch 48 to rails 38. An intermediate switch 54 is slidably mounted on rails 38 and includes a switch 56 extending upwardly therefrom. Switch 56 includes a movable switch arm 58 with a roller 60 mounted on the outer end thereof. Switch 54 includes a set screw 62 for fixing the position of switch 54 on rails 38.

As can be seen in FIGS. 1 and 2, transport clamp 34 has three fingers, 70, 72 and 74 extending from the base thereof for engagement with whisker switches 44, 50 and switch 56, respectively. As is also shown in FIG. 1, plate 22 is formed with a slot 80 therein. As will be illustrated hereinafter in greater detail, transport clamp 34 extends through slot 80 and is controlled to move forward and rearward within the slot.

A punch clamp 82 is mounted to plate 22 by bolts 84 and 85 to receive tube T along path 30. Punch clamp 82 is selectively adjustable in plate 22 along a slot 83.

A saw clamp 90 is mounted along path 30 for receiving tube T therethrough. A forming mandrel 92 is also mounted to plate 22 along path 30 for receiving tube T therethrough. Plate 22 is formed with a vertical slot 94 for receiving a saw assembly 96 therethrough to selectively engage tubing T to sever the tubing.

Referring still to FIG. 1, an end forming unit 100 is mounted to plate 22 and includes a pair of guide rails 102 and 104 mounted vertically to plate 22. A slide plate 106 is captured between rails 102 and 104 for sliding engagement therebetween. A first forming unit 108 and a second forming unit 110 are mounted on plate 106. Both forming units 108 and 110 include forming heads 112 and 114, respectively, which are selectively extendable outwardly along the longitudinal axis of units 108 and 110 by the control of hydraulic fluid to units 108 and 110 through hydraulic lines 116 and 118, respectively. Plate 106 is movable horizontally between rails 102 and 104 by a control arm 130 attached to plate 106 by bolt 131. Arm 130 may be selectively moved along a vertical axis as will be described hereinafter in greater detail. Stop pins 132 and 134 extend outwardly from plate 22 for engagement with adjustable bolts 136 and 138 extending downwardly from plate 106 as will be discussed hereinafter in greater detail. Stop pins 132 and 134 are retractable in accordance with the operation of the invention.

Referring still tp FIG. 1, an end forming unit 100 is controlled to align forming unit 108 and its respective forming head 112 along path 30 by varying the position of plate 106 through the movement of arm 130 sliding plate 106 between rails 102 and 104. This alignment is accomplished by moving arm 130 downwardly until bolt 136 engages stop pin 132.

Subsequent to completion of a desired forming step by forming unit 108, pin 132 is retracted and arm 130 lowered until bolt 138 engages stop pin 134. Forming unit 110 and its respective forming head 114 is then aligned with predetermined path 30 and tube T therealong. Subsequent to a forming operation by forming unit 110 and forming head 114, both forming units 108 and 110 are raised to the position illustrated in FIG. 1 to permit ejection of the formed tube piece from forming mandrel 92.

The unit is controlled by a microprocessor based programmable controller 140 such as the IPC 90 produced by Industrial Solid-State Controls, Inc., 11254 Langdon, Houston, Tex. 77072. The microprocessor includes a console 142 housing two logic interfaced modules, 8 input/output modules, and a simulator. The unit further includes a read/write memory loader monitor 144. A central processing unit is also incorporated and is disclosed hereinafter in more detail.

Referring now to FIG. 3, a vertical section view through transport clamp 34 and switch 54 is illustrated. Transport clamp 34 includes a clamp head 150 consisting of a body 152 having a neck 154 extending horizontally therefrom through slot 80 in plate 22. Head 150 includes a cap 156 attached to body 152 by appropriate bolts 158. Cap 156 includes a neck portion 160 receivable in a slot 162 in body 152 and having a semicircular groove 164 formed therein to define the path for tube T. A mating jaw 166 is slidably received within slot 162 and has an actuation shaft 168 fixedly attached thereto. Jaw 166 is formed with a semicircular groove 167 cooperating with semicircular groove 164 of cap 156 to receive tube T therethrough. Shaft 168 extends through body 152 to a control cylinder 170 mounted to body 152 on the back side of plate 22. Hydraulic fluid is delivered to and from cylinder 170 by lines 172 and 174 coupled to cylinder 170 by fittings 176 and 178, respectively. Head 150 is mounted to a slide bar 180 at neck 154. Bar 180 is carried between a plurality of upper rollers 182 and lower rollers 184 mounted for rotation from axis shafts 186 and 188, respectively, extending horizontally from plate 22. A slight clearance is provided between slot 80 and neck 154 to permit the movement of head 150 of transport clamp 34 within slot 80.

Figure 4:
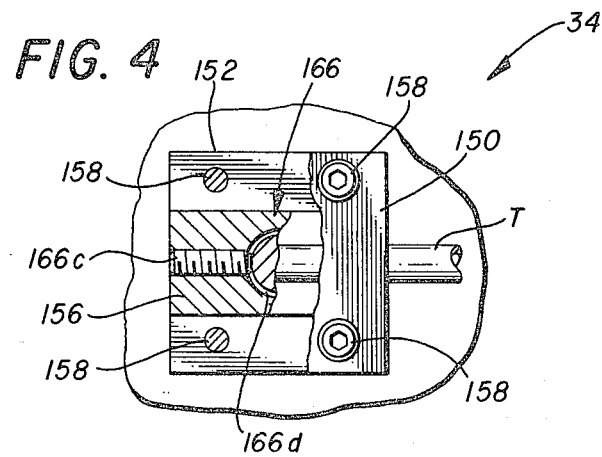
FIG. 4 illustrates a partially broken away front view of the transport clamp illustrated in FIG. 1.

Referring to FIG. 3 in conjunction with FIG. 4, jaw 166 consists of a cylinder portion 166a having a threaded aperture therein for receiving shaft 168 and a jaw portion 166b secured to cylinder portion 166a by a set screw 166c. Set screw 166c is engaged within an angular groove 166d of cylinder portion 166a. This arrangement facilitates the removal of jaw portion 166b and the substitution for another jaw portion having a different size semicircular groove 167 to facilitate use of the present apparatus with differing sizes of tubing. In the same way, cap 156 may be substituted for a cap having a different size semicircular groove 164 corresponding to that of jaw portion 166b to facilitate the use the apparatus for differing sizes of tubing.

FIG. 3 also illustrates rails 38 of limiter assembly 36 and switch unit 54 mounted thereon. Switch 56 including arm 58 and roller 60 extending from switch 54 is illustrated. Set screw 62 extends into switch 54 and against slide rail 38 to fix switch unit 54 to rails 38. Finger 74 extending downwardly from transport clamp body 52 is in line with roller 60 of switch 56 such that finger 74 engages roller 60 to activate switch 56 upon passage of transport clamp 34 past switch 54. In a like manner, fingers 70 and 72 of transport clamp 34 (FIG. 1) are in line with whisker switches 50 and 44 of switch units 48 and 42, respectively, such that these whisker switches are engaged upon movement of the transport clamp within slot 80.

As can be seen in FIG. 3, the movement of shaft 168 by activation of cylinder 170 forces jaw 166 toward cap 156 of head 150 causing the engagement of tube T between jaw 166 and cap 156. Cylinder 170 may also be actuated to retract shaft 168 and thus release the clamping action on tube T to permit the free movement of transport clamp 34 relative to tube T.

Referring to FIG. 5, a section view of the punch clamp 82 is illustrated. Punch clamp 82 includes a body 250 having a cap 256 attached thereto by suitable bolts 258 and 260. Cap 256 includes a semicircular groove 262 for receiving tubing T therethrough. A clamping jaw 264 is captured between body 250 and cap 256 and includes a corresponding semicircular groove 266 for cooperating with groove 262 of cap 256 to receive tube T therebetween. A tube punch 268 is received within a circular bore 270 formed within jaw 264. A punch nipple 272 extends outwardly from punch 268 and is received within an aperture 274 communicating between bore 270 and semicircular groove 266 of jaw 264. Punch 268 further extends through an aperture 290 formed within the back wall of body 250 and receives an actuation shaft 292 into a threaded bore 294. Actuation shaft 292 is operated by a hydraulic cylinder 296 attached by appropriate bolts 298 and 300 to a slide plate 297. Slide plate 297 has a step 297a which is engaged in slot 83 (FIG. 1). Body 250 is attached to slide plate 297 by bolts 84 and 85 (FIG. 1). By tightening bolts 84 and 85, body 250 is engaged toward plate 297 to clamp punch clamp 82 to plate 22. With bolts 84 and 85 loose, punch clamp 82 may be adjusted along slot 83 in plate 22 as desired. Hydraulic lines 302 and 304 are attached by appropriate fittings 306 and 308, respectively, to cylinder 296 for directing hydraulic fluid to and from the cylinder for selective control of shaft 292 and punch 268.

A compression spring 320 is captured between punch 268 and the bottom wall of bore 270 formed within jaw 264 and normally urges jaw 264 ahead of and away from punch 268.

Referring still to FIG. 5, punch nipple 272 has a circular cross section with a tapered forward end inclined at approximately 30° from the lower to upper surface. The center line of nipple 272 is slightly above the tangent of tube T as it is positioned between jaw 264 and cap 256. A hole is "punched" in tube T by actuating cylinder 296 and advancing punch 268 and nipple 272 to bite out an aperture along the top side of the tube. As punch 268 is advanced by the translation of shaft 292, spring 320 urges jaw 264 toward cap 256 to initially clamp tube T prior to the movement of nipple 272 against the tubing. Subsequent to severing the tubing, spring 320 continues to engage jaw 264 against the tubing while nipple 272 is withdrawn from the tubing thereby acting as a stripper to prevent distortion of the tubing during the withdrawal of the nipple. Continued withdrawal of punch 268 results in the release of pressure from jaw 264 on tubing T and permits the translation of the tubing within the punch for subsequent operations.

FIG. 6 illustrates a section view of saw clamp 90 taken along lines 6—6 of FIG. 1. Saw clamp 90 includes a body 350 attached by appropriate bolts 352 and 354 to plate 22. A cap 356 is attached to body 350 by appropriate bolts 358 and 360. Cap member 356 includes a semicircular cutout 362 for accommodating tube T therealong. Body 350 has a rectangular cutout therethrough for receiving a slidable jaw 368 therein. Jaw 368 has a semicircular groove 370 formed thereon to cooperate with cutout 362 of cap 356 to clamp tube T therebetween. Jaw 368 has a cylindrical bore 374 formed therein for receiving a cylindrical driver 376. Driver 376 is formed with a circumferential groove 378 near one end thereof. Jaw 368 receives a set screw 380 therethrough and within groove 378 to fix jaw 368 to driver 376. Driver 376 has a threaded bore 382 for receiving an actuation shaft 384 driven by hydraulic cylinder 386. Cylinder 386 is attached to plate 22 by bolts 388 and 390. Hydraulic lines 392 and 394 are attached to cylinder 386 by fittings 396 and 398 for directing hydraulic fluid to the cylinder for driving actuation shaft 384. As shaft 384 is extended from cylinder 386, driver 376, and jaw 368 attached thereto, are forced toward cap 356 engaging tube T between jaw 368 and cap 356 as illustrated. The retraction of shaft 384 relieves this clamping pressure by the withdrawal of jaw 368.

Figure 7:
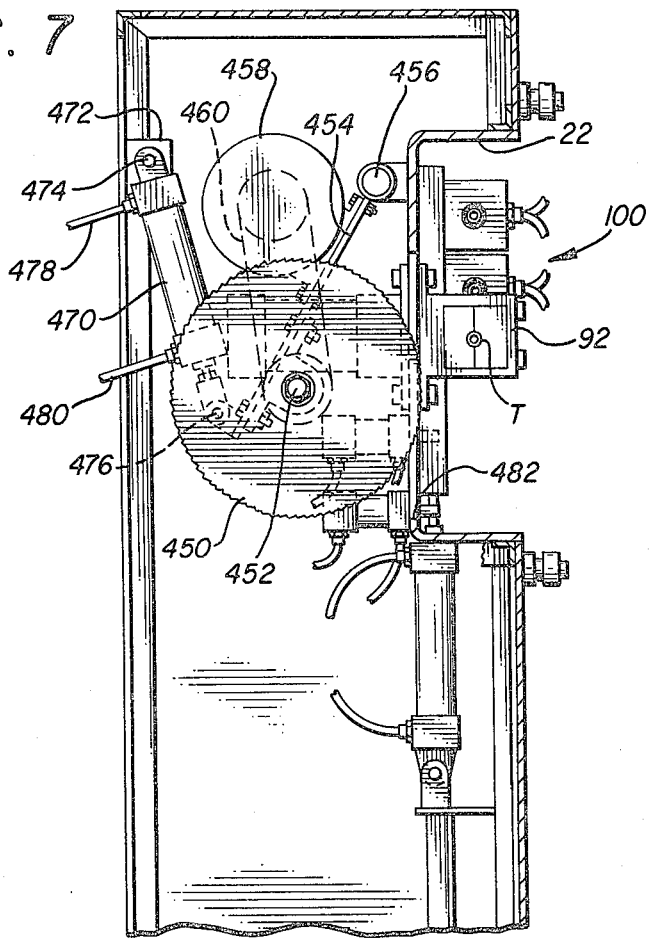
FIG. 7 illustrates a section view taken along line 7—7 of FIG. 1.

Referring to FIG. 7, saw assembly 96 includes a saw blade 450 mounted on a shaft 452. Shaft 452 is rotatively mounted on a plate 454 pivotally attached to frame plate 22 by suitable pins 456. Shaft 452 is rotated by motor 458 by way of a belt 460 mounted between appropriate pulleys on motor 458 and shaft 452 (not shown). A hydraulic cylinder 470 is mounted between frame 472 and plate 454 by suitable pins 474 and 476. Hydraulic cylinder 470 is supplied hydraulic fluid by lines 478 and 480 to retract and extend the cylinder as required. As can be seen in FIG. 5, by extending cylinder 470, saw blade 450 is made to pass through a slot 482 in plate 22 to sever tubing T moving on the frontward side of plate 22.

Figure 8:
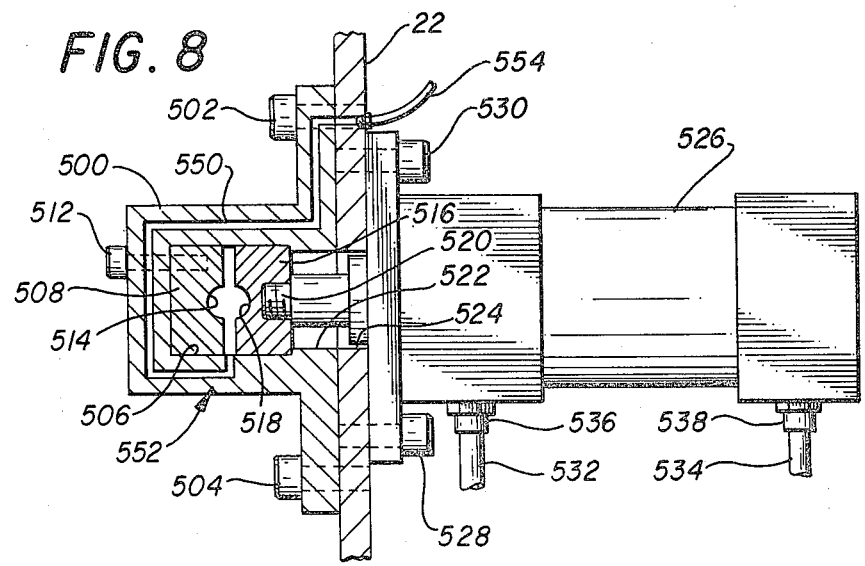
FIG. 8 illustrates a section view taken along line 8—8 of FIG. 1.

FIG. 8 illustrates a vertical section through forming mandrel 92. Mandrel 92 includes a rectangular frame 500 mounted by appropriate bolts 502 and 504 to plate 22. Frame 500 includes a rectangular aperture 506 therethrough. Aperture 506 receives a first forming die 508 secured within aperture 506 by appropriate bolts 510 and 512. Forming die 508 includes a semicircular groove 514 formed therein for receiving tube T therealong. A second forming die 516 is positioned within rectangular aperture 506 of frame 500 and includes a semicircular groove 518 cooperating with semicircular groove 514 of forming die 508 to receive tube T therethrough. Die 516 is maintained in position within frame 500 by a shaft 520 engaged to die 516. Shaft 520 extends from die 516 through an aperture 522 in frame 500 and an aperture 524 in plate 22 to a hydraulic cylinder 526. Cylinder 526 is mounted to plate 22 by appropriate bolts 528 and 530. Hydraulic lines 532 and 534 are mounted by appropriate fittings 536 and 538, respectively, to cylinder 526 to direct hydraulic fluid to cylinder 526 for extending and retracting shaft 520. By extending shaft 520, die 516 is engaged against die 508 to clamp tubing T therebetween.

Referring still to FIG. 8, an internal air passage 250 is formed through frame 500 and communicates to aperture 506 at point 552 corresponding to the parting line between dies 508 and 516. Air is communicated to passage 550 by air line 554 attached to plate 22 by suitable fittings.

As will be appreciated by reviewing FIG. 6, dies 508 and 516 may be readily removed from frame 500 and replaced by dies of varying designs to accommodate both differing tube diameters as well as to operate with forming units 100 to perform different forming steps on the end of the tube. This is accomplished by removing bolts 510 and 512 to replace forming die 508 and by detaching forming die 516 from shaft 520 and replacing it by the desired die.

Figure 9:
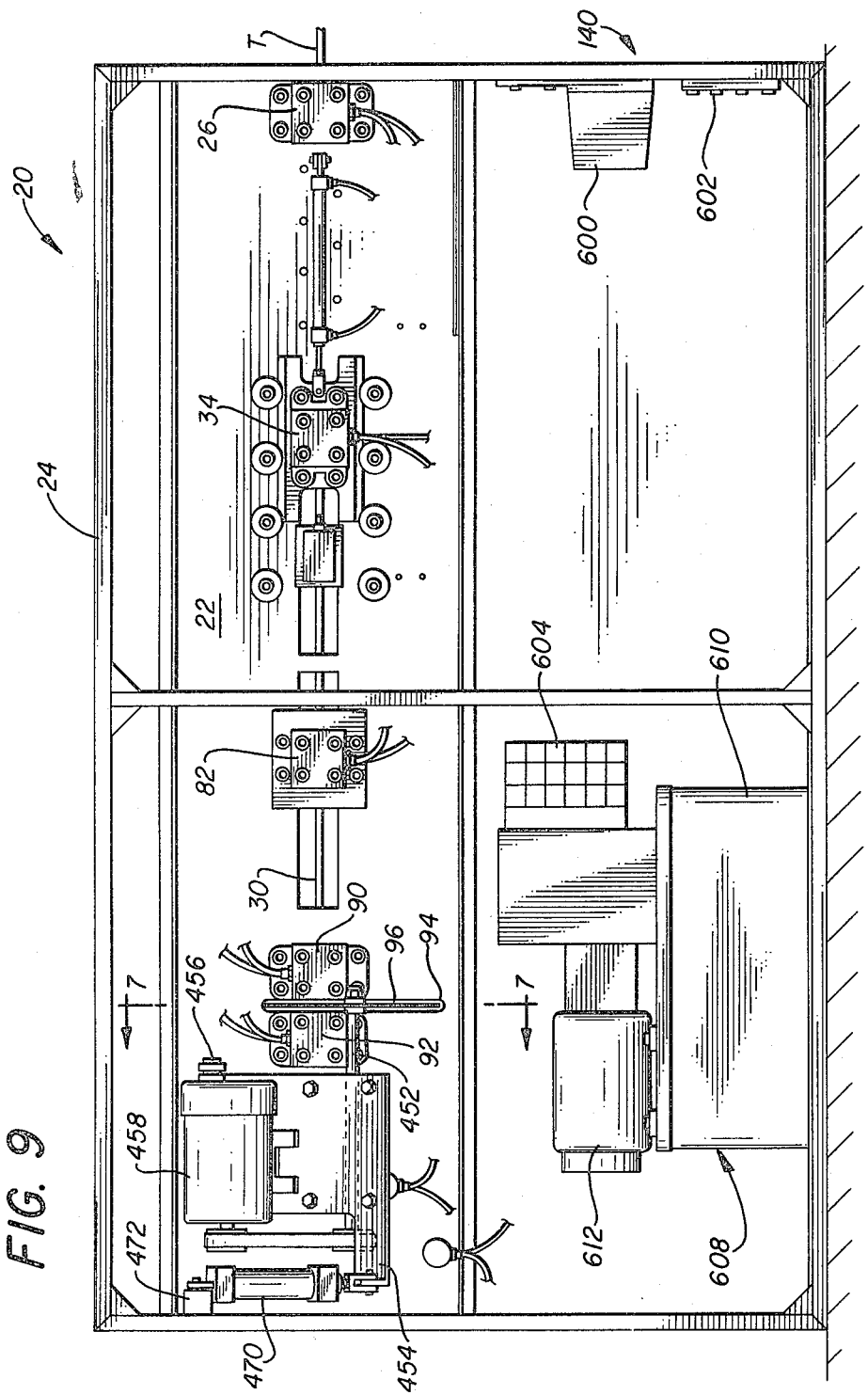
FIG. 9 illustrates a rear view of the tube forming and cutting apparatus illustrated in FIG. 1.

FIG. 9 illustrates the side of the unit opposite that shown in FIG. 1. Referring to FIG. 9, there is shown a central processing unit 600 connected by appropriate leads to microprocessor controller 140 illustrated in FIG. 1. Central processing unit 600 is connected by way of appropriate leads 602 to a plurality of valves 604. Valves 604 control the passage of hydraulic fluid to the various components in the system. A hydraulic fluid supply and discharge unit 608 includes a supply tank 610 and a pump system 612 for feeding hydraulic fluid to valve system 604.

As can be seen in FIG. 9, the forward clamp, transport clamp, punch clamp, saw clamp, saw assembly, forming mandrel and forming unit each have appropriate hydraulic lines connected thereto to control these individual units as required. The discharge of hydraulic fluid to these units is in turn controlled by valve system 604 which is in turn controlled by central processing unit 600.

Figure 10A:
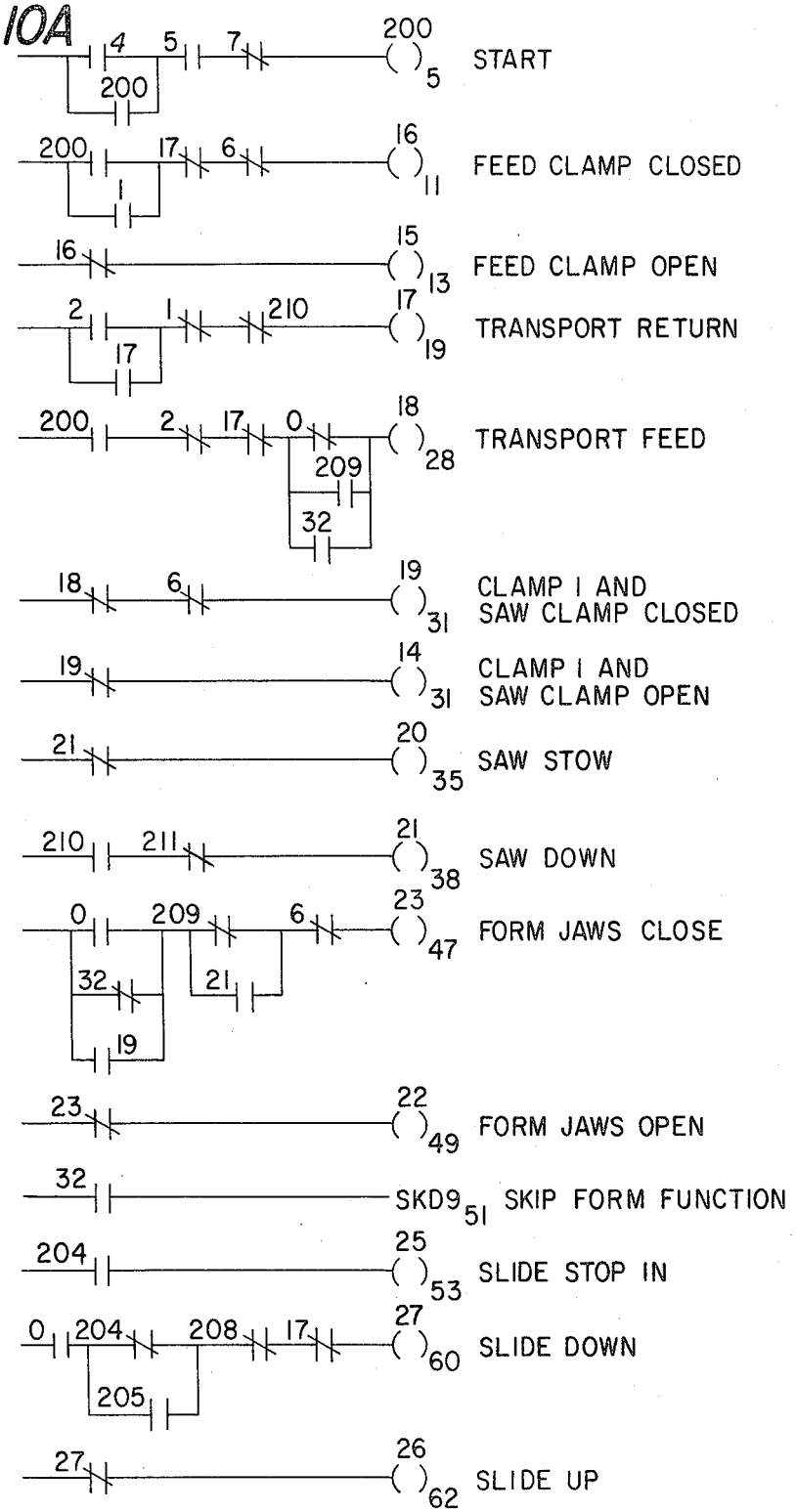
FIGS. 10A, 10B and 10C illustrate a ladder diagram illustrating the program used in controlling the apparatus of the present invention.
Figure 10B:
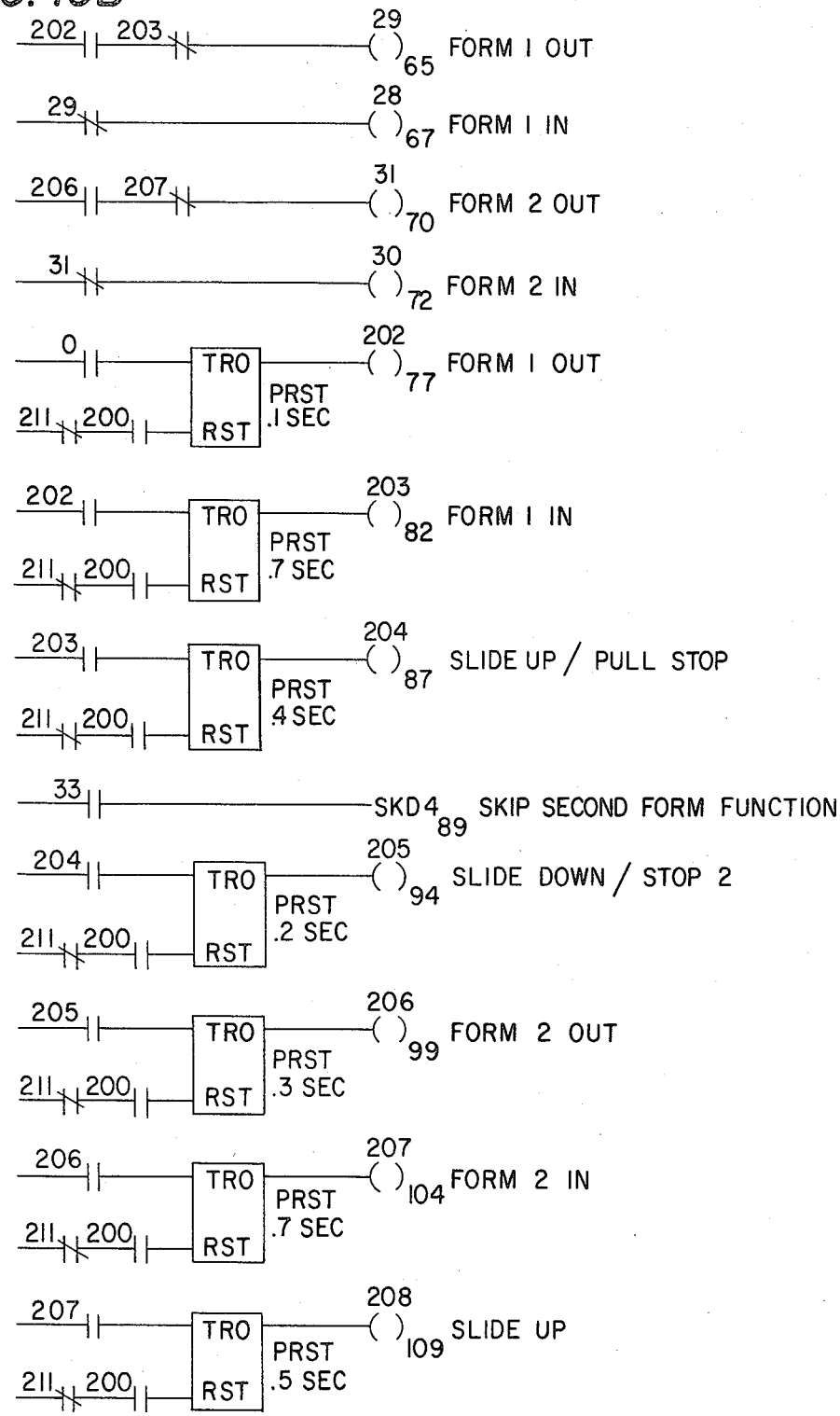
Figure 10C:
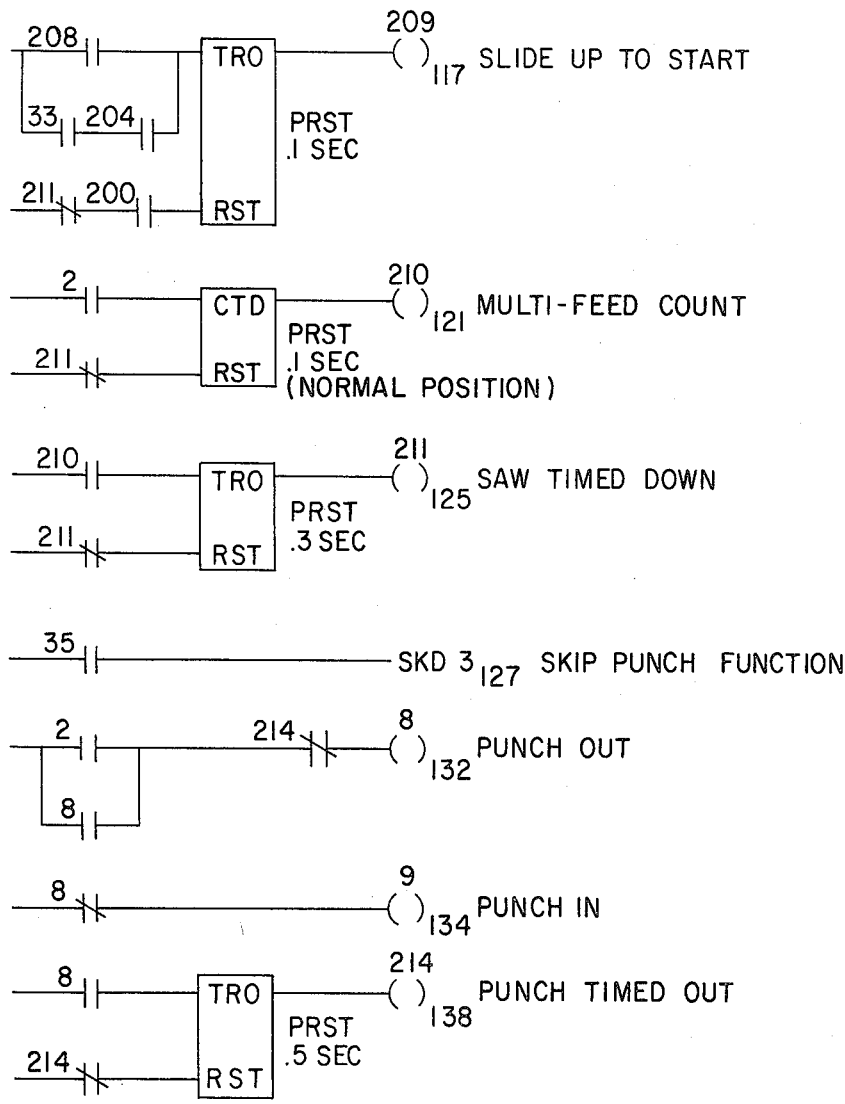

In operation of the system as will hereinafter be described in greater detail, the microprocessor may be programmed according to the ladder diagram illustrated in FIGS. 10A, 10B and 10C. This diagram provides the program necessary to operate the unit as will be hereinafter described in greater detail. Because the ladder diagram illustrated in FIGS. 10A, 10B and 10C is self-explanatory to those skilled in the art of using a microprocessor of the type incorporated in the present invention, a detailed step-by-step description of each program step is not provided herein.

The tube forming and cutting apparatus disclosed above operates in the following manner. Feed clamp 26 is opened to permit the insertion of tube T within the clamp and between straightening rollers 28. Tube T is engaged within transport clamp 34 and drawn along path 30 through punch clamp 82, saw clamp 90 and forming mandrel 92. At this point, the microprocessor is activated and the machine is completely controlled automatically by the computer system. As controlled, transport clamp 34 is closed to engage tube T and immediately thereafter moves along the predetermined path 30. At this point, the microprocessor is activated and the system is automatically controlled by the microprocessor in accordance with the program illustrated in FIGS. 10A, 10B and 10C. With feed clamp 26 open, transport clamp 34 is closed to grasp tube T and moved to the right, as viewed in FIG. 1, to draw tube T along predetermined path 30. As transport clamp 34 moves along the predetermined path, finger 74 extending from the base of transport clamp 34 engages whisker switch 56. At this point, transport clamp 34 is arrested and punch clamp 82 operated. Saw assembly 96 is operated to cut off tube T in sequence with the punch assembly. Punch clamp 82, saw clamp 90 and forming mandrel 92 are in their closed position upon actuation of saw assembly 96 to sever tube T.

After a predetermined lag period, saw clamp 90 is retracted and transport clamp 34 continues along predetermined path 30 until finger 72 extending from the base of transport clamp 34 engages forward whisker switch 50. At this point, transport clamp 34 is released and feed clamp 26, saw clamp 90, and forming mandrel 92 are engaged while transport clamp 34 moves along the predetermined path to the left, as seen in FIG. 1, until finger 70 extending from the base of transport clamp 34 engages whisker switch 44. At this point, transport clamp 34 engages tubing T and moves it to the right along path 30, as viewed in FIG. 1, with feed clamp 26, punch clamp 82, saw clamp 90 and forming mandrel 92 in an open position and saw assembly 96 retracted. As tubing T moves within forming mandrel 92, the initially severed piece of tubing is appropriately positioned with its end substantially aligned with the face of forming mandrel 92 confronting forming units 108 and 110.

With the severed piece of tubing within forming mandrel 92, forming assembly 100 is actuated to align forming unit 108 with tubing I along predetermined path 30. This alignment is facilitated by drawing plate 106 downwardly until stop pin 132 is engaged by adjustment bolt 136 mounted within slide plate 106. Subsequent to this alignment, forming head 112 is extended by the control of hydraulic fluid into appropriate lines attached to forming unit 108 to cooperate with forming mandrel 92 and perform an initial operation on the end of the tube clamped therein.

Forming head 112 is then withdrawn and slide plate 106 momentarily raised to permit the retraction of stop pin 132. Slide plate 106 is then drawn downwardly until stationary stop pin 134 is engaged by adjustment bolt 138 to align forming unit 110 with tube T along predetermined path 30. Subsequent to this alignment, forming head 114 is extended to cooperate with forming mandrel 92 to perform a second forming function on the end of tube T engaged within the forming mandrel. Subsequent to these forming operations, forming head 114 is retracted and slide plate 106 is raised to its uppermost position.

These end forming operations are time controlled such that a particular step is operated for a predetermined period of time. Subsequent to these operations, feed clamp 26, punch clamp 82, saw clamp 90 and forming clamp 34, now at its position with finger 70 aligned with whisker switch 44, is actuated to clamp tube T and moved to the right, as viewed in FIG. 1, until finger 74 extending from the base thereof engages whisker switch 56. At this point, punch clamp 82 is operated and saw clamp 90 and forming mandrel 92 are engaged while saw assembly 96 is advanced to cut tube T. With the movement of tube T, tubing is advanced into forming mandrel 92 to discharge the tube component formed within the mandrel. Further, air injected through forming mandrel along air passages 550 and between dies 508 and 516 (FIG. 8) facilitates the ejection of the completed tube component from the forming mandrel. From this point, the above-identified description continues in a cyclic fashion to produce numerous tube components having both a punched operation and one or more end formed operations thereon.

As can be appreciated from the above disclosure, the length of tube fed through the unit prior to operation of the saw assembly to cut the tube may be adjusted according to the positioning of limiter switches 42 and 48. The position of operation of the punch clamp may be controlled by the placement of limiter switch 54. Further, the computer control may be varied by merely inputting a desired instruction into the memory loader monitor such that the transport clamp cycles through several repetitions between limiter switches 42 and 48 prior to the operation of either punch clamp 82 or saw assembly 96. In this way, tube components may be fed into forming mandrel 92 and formed by forming units 108 and 110, then fed further along the system prior to the activation of saw assembly 96. In this case, the end of the tube is formed prior to the severing of the tube component from the continuous tube.

It will also be appreciated that the saw assembly may be so operated in conjunction with the transport clamp that a plurality of severed pieces may be loaded within forming mandrel 92 as they are moved therethrough. Each piece is appropriately aligned with the end of the forming mandrel and formed by forming units 108 and 110 and then successively ejected from the forming mandrel by the continued progression of the severed components through the forming mandrel by the incoming movement of successively severed tube pieces.

By the present invention, it will be appreciated that the use of a microprocessor control unit permits use of the present invention to produce an almost unlimited variation of tube components. For example, any length of tube piece may be formed having any number of variously positioned punched holes therein, or none at all, and at least two forming operations on the end thereof. Of course, more than two operations could be conducted by merely adding additional punch units to forming assembly 100. Further, it will be appreciated by those skilled in the art that the computer program controlling the microprocessor may be varied such that various tube pieces may be produced rather than merely producing a standard tube piece repeatedly. Likewise, the system may be used in conjunction with a counter such that a specified number of components are produced of one type with the machine then automatically producing a given number of differing tube components.

Therefore, the present invention discloses a extremely efficient and economical system for producing tube components of various lengths and sizes having end formed operations automatically performed thereon and with any desired number and arrangement of apertures therein. In the present system, the tube may be first formed and then fed through the system and later severed. Likewise, the system may be controlled to sever a plurality of tube components subsequent to a punch forming operation, aligning these severed components in a forming mandrel and advancing them sequentially to perform end forming operations thereon as their ends are exposed to end forming units.

Although preferred embodiments of the invention have been described in the foregoing detailed description and illustrated in the accompanying drawings, it will be understood that the invention is not limited to the embodiments disclosed, but is capable of numerous rearrangements, modifications, and substitutions of parts and elements without departing from the spirit of the invention. The present invention is therefore intended to encompass such rearrangements, modifications and substitutions of parts and elements as fall within the scope of the appended claims.

What is claimed is:

1. An apparatus for forming tube components from a length of tube comprising:
   a transport clamp mounted for controlled movement in a first and a second direction along a predetermined path,
   actuation means for clamping the tube within said transport clamp when said transport clamp is moving in the first direction for drawing the tube along the predetermined path, adjustable switch means cooperating with said transport clamp for controlling the movement of said transport clamp in the first and second directions, forming clamp means on said predetermined path for selectively clamping said tube when said transport clamp is moving in the second direction, cutoff means positioned along said predetermined path for cutting the tube into severed tube pieces, control means for operating said cutoff means in relation to the movement of said transport clamp, tube forming means selectively positionable within the predetermined path for forming the end of the tube, and intermediate switch means adjustable relative to said adjustable switch means for controlling said tube forming means in relation to the movement of said transport clamp.

2. The apparatus according to claim 1 further comprising:

tube straightening means positioned in the predetermined path ahead of said transport clamp for straightening the tube and delivering said tube along the predetermined path.

3. The apparatus according to claim 1 further comprising:

control means for controlling the number of cycles said transport clamp moves between said adjustable switch means prior to actuation of said cutoff means.

4. The apparatus according to claim 1 wherein said tube forming means includes:

a first forming head, slide means for selectively moving said forming head laterally into the predetermined path and in line with the tube, and means for advancing said head against the tube to form the end of the tube.

5. The apparatus according to claim 4 further comprising a second forming head mounted on said slide means, means for moving said second forming head on said slide means to align said second forming head with the tube, and means for advancing said second forming head to perform a second operation on the end of the tube.

6. The apparatus according to claim 1 further comprising:

a punch clamp positioned in the predetermined path for receiving the tube therethrough, actuation means for clamping the tube in said punch clamp, and punch means within said punch clamp for punching the tube.

7. The apparatus according to claim 6 further comprising:

means for adjusting the position of said punch clamp relative to said cutting means.

8. The apparatus according to claim 6 further comprising:

means for sequencing the actuation of said punch clamp with the movement of said transport clamp.

9. The apparatus according to claim 1 further comprising:

pressure means associated with said forming clamp means for discharging a pneumatic pressure against the tube clamped in said forming clamp means subsequent to cutting the tube by said cutoff means.

10. An apparatus for forming tube components from a length of tube comprising:

an end forming mandrel positioned on a predetermined path for receiving the tube therethrough, tube transport means for selectively advancing the tube along the predetermined path to a position with the lead end of the tube at a predetermined position relative to the end forming mandrel, forming means selectively positionable in the predetermined path for cooperating with said forming mandrel to form the end of the tube, adjustable switch means cooperating with said transport means for controlling the movement of said transport means, intermediate switch means cooperating with said transport means and adjustable relative to said adjustable switch means for controlling said forming means, and cutoff means positioned along said predetermined path for cutting said tube into a predetermined length in response to said intermediate switch means.

11. The apparatus according to claim 10 further comprising:

control means for controlling the movement of said transport clamp means relative to said adjustable switch means prior to actuation of said cutoff means.

12. The apparatus according to claim 10 further comprising:

tube straightening means positioned in the predetermined path ahead of said transport clamp for straightening the tube and delivering said tube along the predetermined path.

13. The apparatus according to claim 10 further comprising:

a punch clamp positioned in the predetermined path for receiving the tube therethrough, actuation means for clamping the tube in said punch clamp, and punch means within said punch clamp for punching the tube.

14. The apparatus according to claim 13 further comprising:

means for adjusting the position of said punch clamp relative to said cutoff means.

15. The apparatus according to claim 13 further comprising:

means for sequencing the actuation of said punch clamp with the movement of said transport means.

16. The apparatus according to claim 10 further comprising:

pressure means associated with said forming clamp means for discharging a pneumatic pressure against the tube clamped in said forming clamp means subsequent to cutting the tube by said cutoff means.

17. An apparatus for forming tube components from a length of tube comprising:

an end forming mandrel positioned on a predetermined path for receiving the tube therethrough, tube transport clamp means for selectively advancing the tube along the predetermined path to a position with the lead end of the tube at a predetermined position relative to the end forming mandrel, tube forming means selectively positionable in the predetermined path for cooperating with said forming mandrel to form the end of the tube, cutoff means positioned along said predetermined path for cutting said tube into a predetermined length prior to being formed by said forming means, said severed length being secured in said end forming mandrel prior to being formed by said forming means, adjustable switch means cooperating with said transport clamp means for controlling the movement of said transport clamp, and intermediate switch means adjustable relative to said adjustable switch means and cooperating with said transport clamp means for controlling said tube forming means.

18. The apparatus according to claim 17 further comprising:

control means for controlling the movement of said transport clamp means relative to said adjustable switch means prior to actuation of said cutoff means.

19. An apparatus for forming tube components from a length of tube comprising:

tube transport means for selectively advancing the tube along a predetermined path, a punch clamp positioned in the predetermined path for receiving the tube therethrough, actuation means for clamping the tube in said punch clamp, punch means within said punch clamp for punching the tube, adjustable switch means actuated by said tube transport means for arresting said transfer means and actuating said punch means to punch said tube, an end forming mandrel positioned on the predetermined path for receiving the tube therethrough, forming means selectively positionable in the predetermined path for cooperating with said forming mandrel to form the end of the tube, and intermediate switch means adjustable relative to said adjustable switch means and actuated by said tube transport means for controlling said end forming means.

20. The apparatus according to claim 19 further comprising:

means for adjusting the position of said punch clamp relative to said cutoff means.

21. The apparatus according to claim 19 further comprising:

means for sequencing the actuation of said punch clamp with the movement of said transport means.

* * * * *

UNITED STATES PATENT AND TRADEMARK OFFICE
CERTIFICATE OF CORRECTION

PATENT NO. : 4,281,530

DATED : August 4, 1981

INVENTOR(S) : William G. McElhaney

It is certified that error appears in the above—identified patent and that said Letters Patent is hereby corrected as shown below:

Column 1, line 54, change "orovides" to -- provides --.
Column 2, line 54, change "of" to -- or --;
    line 68, change "transparent" to -- transport --.
Column 3, line 66, change "patch 30" to -- path 30 --.
Column 4, line 6, change "clamping 34" to -- clamp 34 --;
    line 9, change "an" to -- and --;
    line 17, change "and includes" to -- and also includes --;
    line 18, change "an" to -- and --;
    line 19, change "set screw" to -- a set screw --.
Column 5, line 67, change "body 52" to -- body 152 --.
Column 7, line 61, change "passage 250" to -- passage 550 --.
Column 9, line 16, change "I" to -- T --.
Column 11, line 42, change "comprising" to -- comprising: --.

Signed and Sealed this

Tenth Day of November 1981

[SEAL]

Attest:

GERALD J. MOSSINGHOFF

Attesting Officer

Commissioner of Patents and Trademarks